Oct. 18, 1960 R. W. LARISCH 2,957,088
ELECTRICAL CONTROL CIRCUITS
Filed June 28, 1957
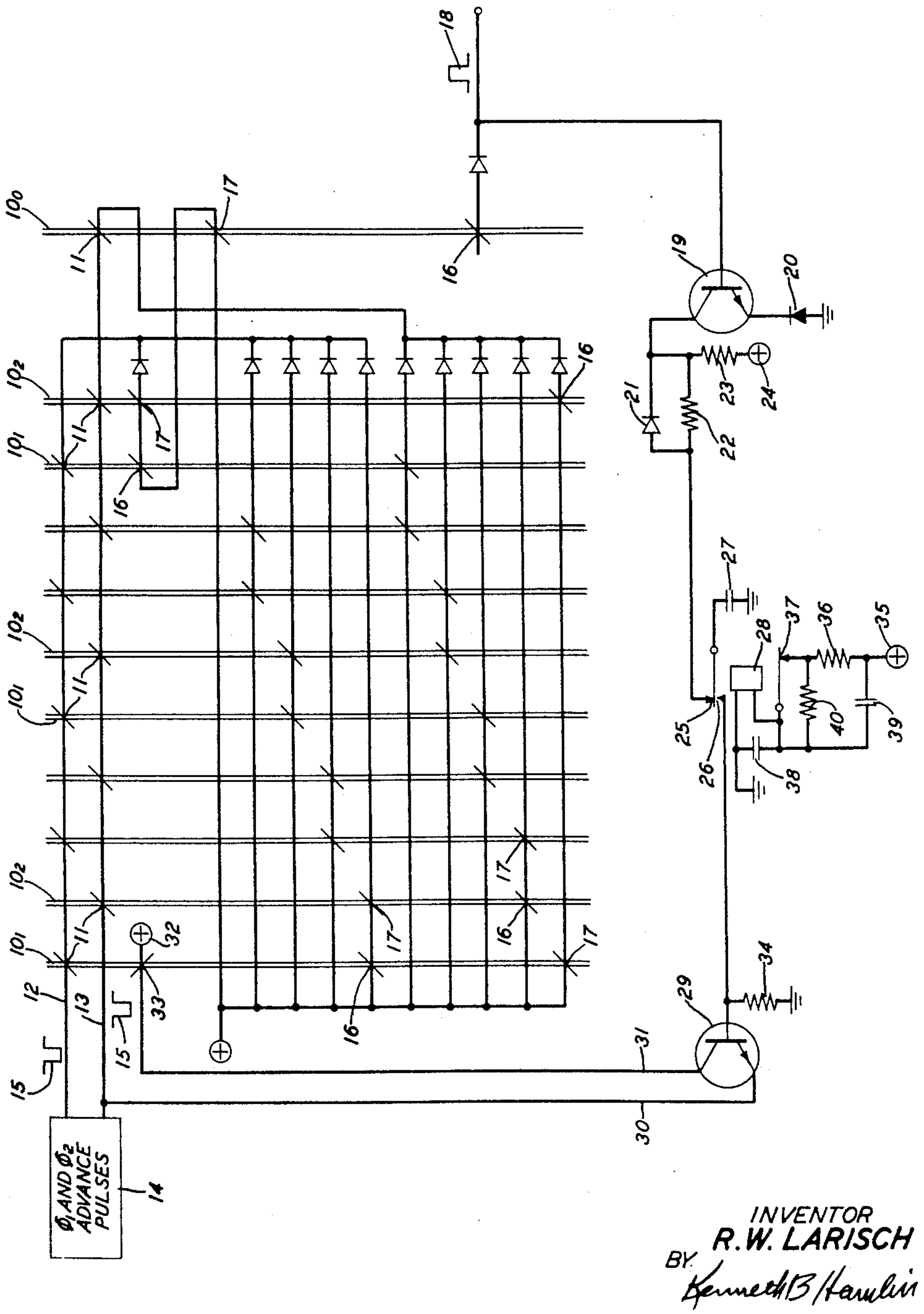
INVENTOR
R. W. LARISCH
BY Kenneth B. Hamlin
ATTORNEY 2,957,088

ELECTRICAL CONTROL CIRCUITS

Richard W. Larisch, Morristown, N.J., assignor to Bell Telephone Laboratories, Incorporated, New York, N.Y., a corporation of New York Filed June 28, 1957, Ser. No. 668,663

10 Claims. (Cl. 307—88)

This invention relates to electrical control circuits and more particularly to control circuits for automatically resetting pulse generating circuits upon failure of output.

In many pulse producing circuits and their applications it is essential that, upon any interruption in the power supply and the resulting interruption in the generating of the output pulses, the pulse generating circuit be restored as quickly as possible to its normal operation. The mere restoration of power, however, does not in every case effect a resumption of the normal generation of output pulses. This is the case, for example, where the production and proper sequence of output pulses is dependent upon a sequential operation of the pulse generating circuit. In such a circuit each operative step is dependent upon the immediately preceding step and in order to function properly through a complete cycle of operation the circuit must at some stage be in a condition whereby such an operative step can be completed. If no stage of the circuit is in such a condition mere restoration of power will not necessarily insure the resumption of a normal output.

One pulse producing circuit characterized by sequential operation and requiring a particular condition in one of its stages before normal operation can be commenced is the magnetic core multiphase sequential circuit described by M. Karnaugh in the Proceedings of the I.R.E., vol. 43, of May, 1955, pages 570–583. In Fig. 17 of that description is shown a two-phase stepping switch which requires that one core of the switch must be in a particular condition of remanent magnetization on its hysteresis loop before the application of alternate advance current pulses can initiate the normal operation of the circuit. Although output loads are not shown in connection with the circuit referred to, such loads are readily interconnected to realize a pulse divider network in which the problem of restoring a normal output after power interruption is encountered. A pulse divider of this character will be described hereinafter as a convenient circuit for showing an illustrative application of the present invention.

Hitherto means for accomplishing the restoring of the circuit to its required operable state, that is, the resetting function, have included manual means. The disadvantages of such means from the viewpoint of reliability and delay are obvious. Other means for resetting the circuit have encountered a secondary problem. When the resetting operation has been accomplished a normal operation of the circuit may not necessarily have resumed. Thus the resetting operation may have occurred at the wrong time with respect to the application of the power or advance current pulses or the resetting operation may have been maintained for too long a time and thereby itself prevented resumption of normal operation. In any event the resetting operation must be repeated if normal output does not immediately ensue. However, in connection with a repetition of the resetting operation a sufficient time interval must be allowed between resetting operations to assure that a normal output will not follow. Finally, when a normal output does follow, the resetting operation must not then again be repeated lest the normal sequential operation of the circuit be interrupted.

Accordingly it is an object of this invention to accomplish the resetting of sequential pulse generating circuits upon a power interruption to insure the resumption of a normal output upon the restoration of power.

It is another object of this invention to reset a sequential pulse generating circuit upon an interruption and restoration of power and to repeat the resetting operation upon a continued failure of normal output.

A further object of this invention is to automatically prepare a pulse generating circuit for resumption of normal operation when circuit power has been temporarily interrupted and is again restored.

The foregoing objects of this invention are achieved in one specific illustrative embodiment thereof in which a capacitor is permitted to charge from a source of potential. A discharge path is provided for the capacitor, which path includes switching means controlled by the normal output of the sequential stepping circuit with which the present invention may be associated. The capacitor however is periodically disconnected from the potential source and connected to a second switching means which latter means may be controlled by a sufficient charge on the capacitor. The second switching means in turn controls the application of a resetting potential to one of the stages of the sequential stepping circuit to set this stage to the proper operative condition. In the specific illustrative application of this invention to be described, the sequential stepping circuit comprises a plurality of magnetic core stages and the potential so applied is effective to set the first core of the circuit to its proper condition of remanent magnetization. Since more than one application of a resetting potential may be necessary to insure the proper resetting of the circuit, it is a feature of this invention that the connection and disconnection of the charging capacitor is accomplished at a frequency lower than the output frequency of the associated circuit.

It is another feature of this invention that the normal production of output pulses in the sequential stepping circuit with which it may be associated is instrumental in maintaining the elements of the invention inoperative to apply a resetting potential to the stepping circuit. Thus only a failure of normal output will initiate the operation of the resetting circuit of this invention.

According to still another feature of this invention the power pulses themselves are advantageously utilized to perform the resetting function under the control of the novel circuit of this invention. Specifically in the illustrative two-phase sequential stepping circuit to be described as one with which this invention may be associated, the first core is to be set in the resetting operation. Then, in accordance with this feature, the particular two-phase power or advance pulse driving the sequence of cores of which the succeeding core is a member will be applied to set the first core of the circuit. Conveniently the resetting operation is thus performed without any interference with the normal driving power applications.

The foregoing and other objects and features of this invention will be better understood from a consideration of the detailed description which follows when taken in conjunction with the accompanying drawing, the single figure of which shows a schematic circuit diagram of the present invention in association with an illustrative sequential stepping circuit. The latter circuit is depicted in the well-known mirror symbol notation also described by M. Karnaugh in the article previously referred to.

Referring now to the drawing, the present invention is seen as insuring the continued normal output of a sequential stepping circuit comprising a plurality of magnetic cores 10 arranged in an alternating sequence. The magnetic cores 10 may comprise well-known ferrite cores displaying a substantially rectangular hysteresis characteristic. The stepping circuit is arranged in stages with each stage including a core $\mathbf{10}_1$ and a core $\mathbf{10}_2$ and one output core $\mathbf{10}_0$ is provided. In the illustrative stepping circuit being described the circuit is arranged to accomplish a 5-to-1 pulse divider function with one output pulse being produced for every five alternate power or advance pulses applied to the circuit. Advance windings 11 are inductively coupled to each of the cores 10, which windings 11 are serially connected by means of the conductors 12 and 13 to form a pair of advance circuits connected to a source of power or advance pulses 14. Two-phase negative going advance pulses 15, which may be designated $\varphi_1$ and $\varphi_2$ pulses, are alternately applied to the advance circuits to drive the stepping circuit.

Each of the advance circuit conductors 12 and 13 is connected, after the last advance winding 11 of its respective cores 10, to an output network including an output winding 16 and an input winding 17 of each of the cores 10. When a core is in a "set" magnetic condition, the advance current pulse applied via a conductor 12 or 13 switches its magnetic condition. Using the mirror symbolism described by M. Karnaugh in the article previously referred to, a positive current pulse from the power source 14 arriving at any advance winding 11 would establish a flux through the core at that winding 11 in an upward direction as viewed in the drawing. The output network is interconnected in a manner such that the advance current pulse switching the magnetic condition of a core is directed via the output winding 16 of the switching core to set the succeeding core. This interconnection is in accordance with the switching principles also described by M. Karnaugh in the previously cited reference. Upon the application of a $\phi_1$ advance current pulse to the advance winding 11 of the core $\mathbf{10}_1$ of the last stage of the stepping circuit, the advance current will be directed via the input winding 17 of the core $\mathbf{10}_0$ which latter core is thus set together with the core $\mathbf{10}_2$ of the last stage. When the latter core is switched by the following $\phi_2$ advance current pulse the output core $\mathbf{10}_0$ is also switched by the $\phi_2$ advance current which will be obvious from a consideration of the circuit output interconnections. Switching of the output core $\mathbf{10}_0$ produces a positive output signal 18 on the output terminal of the stepping circuit through the output winding 16 of the core $\mathbf{10}_0$. Obviously since the output core $\mathbf{10}_0$ is switched only upon the switching of the core $\mathbf{10}_2$ of the last of the stages of the five stage stepping circuit, an output signal will be produced only upon every fifth application of an advance or power pulse 15 on the conductor 13. It is the latter sequence of output pulses in this specific embodiment, then, which it is an object of this invention to maintain.

The control circuit according to the principles of this invention for automatically resetting a sequential stepping circuit, such as the foregoing, upon the restoration of the power source 14 may now be described. In may be noted that the control circuit also applies the initial input to the first stage core $\mathbf{10}_1$ when the circuit is first turned on, it being obvious that this is merely a special case of power resoration following a power interruption. The control circuit is seen from the drawing to comprise a transistor 19 having its base connected to the output of the stepping circuit. The transistor 19, which could conveniently comprise a part of the output circuit for the stepping circuit, has its emitter connected through a breakdown diode 20 to ground. The collector of the transistor 19 is also connected to a back-biasing diode 21 and, in addition, is connected to a pair of resistors 22 and 23. The latter resistor 23 is connected at its other end to a source of positive poteneial 24. Both the diode 21 and the resistor 22 are connected at their other ends to ground through back contacts 25 and a capacitor 27.

A self-interrupting relay 28 controls the contacts 25 and also operates to connect the capacitor 27 to the base of a transistor 29, operated as a gate, through make contacts 26. The emitter of the transistor 29 is connected via a conductor 30 to the advance circuit conductor 13 which supplies the $\phi_2$ power pulses to the cores $\mathbf{10}_2$ of the stages of the stepping circuit. The collector of the transistor 29 is connected via a conductor 31 to a positive potential source 32 through a setting winding 33 inductively coupled to the core $\mathbf{10}_1$ of the first stage of the stepping circuit. A resistor 34 connected to the base of the transistor 29 provides a clamp for the latter when the contacts 26 are open to provide temperature stabilization.

The operating circuit of the relay 28 includes a positive potential source 35, a resistor 36, interrupter contacts 37, and the relay winding 28. A capacitor 38 is connected across the relay winding; and a capacitor 39, connected between the capacitor 38 and the potential source 35, is introduced to minimize contact noise. Finally, a resistor 40 is connected between the interrupter contacts 37 and the capacitors 38 and 39.

Between the pulses 18 of the normal output of the stepping circuit, which pulses may be regerded as input pulses to the circuit of this invention, the capacitor 27 charges through the normally closed contacts 25 and the resistors 22 and 23. However, the charge across the capacitor is unable to reach the value of the source 24 since the transistor 19 is enabled by a positive potential each time the output pulse 18 is applied to its base. A discharge path is thus provided for the capacitor 27 upon each output pulse 18 which path may be traced through the contacts 25, diode 21, collector and emitter of the transistor 19, and the diode 20 to ground. The latter diode is provided as a threshold means to insure that the discharge path will be completed only if an output pulse 18 of a predetermined or normal voltage magnitude is produced.

Assuming a normal output 18, when the relay 28 operates to close its contacts 26 and thereby connects the capacitor 27 to the base of the transistor 29, the charge on the capacitor 27 will not have risen to a sufficient value to produce a potential across the resistor 34 which exceeds the potential on the emitter of transistor 29. The transistor 29 accordingly remains an open circuit and no effect is produced on the normally operating stepping circuit.

Upon the failure of an output pulse 18 the normally available discharge circuit through the transistor 19 for the capacitor 27 will not be enabled and the capacitor 27 will now assume the full charge of the potential source 24. When the capacitor 27 is now again connected by means of the relay 28 via the contacts 26 to the base of the transistor 29, the latter will be enabled and a circuit path will be established between the positive potential source 32 via the conductors 31 and 30 to the advance circuit conductor 13. Assuming that the operation of the power source 14 has been restored, when a negative going $\varphi_2$ power pulse is now applied to the advance circuit conductor 13, this pulse will also be applied via the setting winding 33 to the core $\mathbf{10}_1$. This negative going pulse will set the core $\mathbf{10}_1$, if the latter is not already in that magnetic condition. Upon the application of the succeeding negative going $\varphi_1$ and $\varphi_2$ pulses to the advance circuit conductors 12 and 13 the set condition will be sequentially stepped along the stepping circuit and a normal output will ensue. Such a normal output will, as previously described, again periodically make available a discharge path for the charging capacitor 27. Should the normal output not immediately follow upon the first resetting operation after the time for stepping of the set condition from the first stage core $\mathbf{10}_1$ to the output core $\mathbf{10}_0$ has elapsed, the capacitor 27 will still have sufficient charge that when it is again connected to the base of the transistor 29 a second application of the negative $\varphi_2$ power pulse will again set the core $\mathbf{10}_1$ by means of the setting winding 33. This operation will be repeated until such time as a normal output of the setting circuit is resumed.

Obviously an interruption or failure of power could occur immediately after one of the cores had been set by the switching of the immediately preceding core. When power is again resumed the normal operation of the control circuit of this invention will then also set core $\mathbf{10}_1$ of the first stage. Thus two cores will be in a set condition and an output will be produced by the condition of the core left set at the power interruption which will be an irregularity from the normal pulse division output. Ordinarily in a circuit such as that here described with which the present invention is adaptable this would be of no great moment. In any event, the present invention concerns itself primarily with the automatic resumption of a normal output and not necessarily with the maintenance of a normal output during a power interruption. Should, however, such an extraneous output pulse be undesirable a simple expedient may be employed to insure that at the resumption of power only the core $\mathbf{10}_1$ of the first stage will be set. A winding may be added to each of the remaining cores of the sequential switch in a sense opposite to that of the winding 33, each of such windings then being connected in series with the winding 33 by means of an extension of the conductor 31. The potential source 32 is then connected to the last of such series connected windings coupled to the core $\mathbf{10}_0$. When a setting pulse is now applied to the winding 33 the core $\mathbf{10}_1$ of the first stage will be set but, because of the sense of the remaining series connected windings, any set cores of the remaining cores will be reset. As a result, the next output from the switch will be the first of the desired normally timed output pulses.

The relay 28 operates in a well-known self-interrupting manner and at a frequency lower than that of the output 18 of the associated stepping circuit to insure that if a normal output 18 is not resumed upon the completion of an operating cycle of the stepping circuit, another resetting application of a $\varphi_2$ power pulse can be made. The series resistor 36 introduces a disparity between the operating times of the contacts 25 and 26 such that the contacts 25 are maintained closed for a substantially longer time than the contacts 26. The latter disparity is necessary to insure that sufficient time is allowed to charge the capacitor 27 fully upon a failure of output 18. The contacts 26 should not, however, be closed so long that the capacitor 27 is completely discharged. The resistor 40 and capacitor 38 serve to establish the relationship of the operate and release time of the relay 28.

What has been described is considered to be an illustrative embodiment according to the principles of this invention and an illustrative application to a pulse dividing circuit. It is to be understood that numerous other arrangements and modifications as well as other applications may be devised therein by one skilled in the art without departing from the spirit and scope of this invention.

What is claimed is:

1. An electrical circuit comprising a resettable first pulse source for normally supplying a continuous train of pulses at a first predetermined frequency, a capacitor, charging means connected to said capacitor, means responsive to said pulses at said first frequency for periodically discharging said capacitor, switching means operative when connected to said capacitor responsive to a predetermined charge thereon for resetting said first pulse source, and means operative at a second predetermined frequency for periodically disconnecting said capacitor from said charging means and connecting said capacitor to said switching means.

2. An electrical circuit as claimed in claim 1, in which said last-mentioned means comprises a self-interrupting relay means.

3. An electrical circuit comprising a capacitor, means including a potential source for charging said capacitor, pulse generating means for normally producing output pulses of a first frequency, means responsive to said normal production of output pulses for normally discharging said capacitor, control means for applying a pulse to said pulse generating means including a switching means, said switching means operative responsive to a predetermined charge on said capacitor when connected thereto, and means for periodically connecting said capacitor to said switching means.

4. An electrical circuit as claimed in claim 3, in which said pulse generating means comprises a sequential stepping circuit having a plurality of stages, each of said stages having two electrically discernible states and in which said control means comprises setting means for setting one of said stages to a particular one of said states.

5. An electrical circuit as claimed in claim 4, also comprising a source of input pulses for operating said pulse generating means and applying an operating pulse to said setting means.

6. In a sequential stepping circuit having a plurality of magnetic core stages, each of the cores being capable of switching from one to another condition of remanent magnetization, advance circuit means including a source of advance pulses, and an output circuit, in combination; a capacitor, means including a potential source for charging said capacitor, a first switching means operated responsive to a normal output on said output circuit, means controlled by said first switching means for periodically discharging said capacitor, setting means including said source of advance pulses for setting a core of one of said stages to a particular one of said conditions of remanent magnetization, a second switching means operative when connected to said capacitor responsive to a predetermined charge on said capacitor for actuating said setting means, and means for periodically connecting said capacitor to said second switching means.

7. In a sequential stepping circuit, the combination according to claim 6, in which said normal output on said output circuit is of a frequency greater than the frequency at which said capacitor is connected to said second switching means.

8. In a sequential stepping circuit, the combination according to claim 7, in which said means for periodically connecting said capacitor to said second switching means comprises a self-interrupting relay means.

9. A circuit for applying a set pulse to the first stage of a sequential circuit on absence of an output pulse from the last stage of the sequential circuit comprising a capacitor, means including a potential source for charging said capacitor, means enabled by an output pulse from said sequential circuit for discharging said capacitor, a pulse source, and means responsive to build up of a predetermined potential on said capacitor when said discharging means is not enabled for applying a pulse from said pulse source to the first stage of said sequential circuit.

10. An electrical circuit comprising a first pulse source means for normally supplying a continuous train of pulses at a first predetermined frequency having a reset condition, a capacitor, charging means connected to said capacitor, a normally incomplete discharge path for said capacitor, first switching means in said discharge path operative responsive to said pulses at said first frequency for periodically completing said discharge path, a second pulse source means for supplying a continuous train of pulses at a second predetermined frequency, conductive means, second switching means operative responsive to said second pulse source means for periodically disconnecting said capacitor from said charging means and connecting said capacitor to said conductive means, and third switching means connected to said conductive means responsive to a predetermined charge on said capacitor for resetting said first pulse source means to said reset condition.

References Cited in the file of this patent

UNITED STATES PATENTS

| | | |
|---|---|---|
| 2,470,895 | Marlowe | May 24, 1949 |
| 2,800,596 | Bolie | July 23, 1957 |